Patented Oct. 22, 1935

2,018,633

UNITED STATES PATENT OFFICE 2,018,633

FLAKED SODIUM CHLORIDE COMPOSITION

Ernest R. Boller, Willoughby, Ohio, assignor to The Grasselli Chemical Company, Cleveland, Ohio, a corporation of Delaware No Drawing. Application May 31, 1934, Serial No. 728,308

1 Claim. (Cl. 23—239)

The present invention refers to sodium chloride in the form of flakes in which the sodium chloride particles are agglomerated by means of an organic adhesive.

The physical and chemical characteristics of sodium chloride have made it practically impossible to produce this substance in the form of small discrete flakes notwithstanding the fact that this commodity could be handled advantageously if available in the form of flakes.

I have found that finely divided sodium chloride suspended in an aqueous solution of an organic adhesive to form a paste-like mass can be transformed into solid, adherent discrete flakes by running such a paste over a heated, moving surface where the water of the paste is evaporated, leaving a coherent film of sodium chloride particles embedded in a matrix of the adhesive. This film is then broken up into individual, discrete flakes which are coherent and can be handled without excessive breaking and dusting.

Such flakes can be used in many technical applications of sodium chloride where the presence of small amounts of the organic adhesive is of no detriment. One specific advantage of my novel flakes is that as long as they are in solid form the chemical nature of the sodium chloride is masked and the flakes can be mixed with corrosive dry chemicals, such as sodium bisulfate, without substantial interaction of the two, which interaction only takes place when the products are in contact with water. Mixtures of my novel sodium chloride composition flakes with sodium bisulfate are, for instance, well adapted for cleaning compounds for household uses.

Flakes of this type can be produced on the usual, standard flaking drums or on any type of apparatus which allows of producing a film of a liquid substance and drying it to solidification.

I can use in the formation of my novel flakes the usual organic adhesives, such as starches, gums, alkali starches, protein glues, gelatine, casein, sulfite cellulose waste, or generally any organic adhesive of colloidal nature and high molecular weight and easy solubility in water.

The flakes produced in this manner distintegrate in contact with liquid water and are easily soluble therein.

The adhesive is naturally to be used in as concentrated solution as possible, so that the paste to be spread out and dried contains a large amount of undissolved sodium chloride.

The amount of adhesive to be used for my novel flakes does not exceed a few per cent of the weight of the sodium chloride to be transformed into flakes.

As a specific example of how I produced my novel flakes I give the following:

Ten parts by weight of gum arabic were dissolved in ten parts of water, the solution heated to the boil and mixed with 100 parts crystalline sodium chloride. This warm paste was then spread upon a heated surface, dried at about 110° C. and the solidified film of sodium chloride-gum mixture broken up into flakes.

The same procedure is applicable to other adhesives such as mentioned above.

Instead of using the adhesive in aqueous solution I can also mix the sodium chloride particles in a molten adhesive such as heated glue, spread this out into a film and then solidify this film by cooling or by chemical treatment such as exposure to form aldehyde vapors when using gelatine as the adhesive.

I claim:

The process of making a sodium chloride composition in flake form which comprises preparing a paste of sodium chloride particles in an organic adhesive, spreading this paste into a film, solidifying said film and breaking it up into flakes.

ERNEST R. BOLLER.